United States Patent [19]

Allada

[11] 4,337,321

[45] Jun. 29, 1982

[54] MULTI-STAGED FOAMING OF THERMOPLASTIC RESIN

[75] Inventor: Sambasiva R. Allada, Midland, Mich.

[73] Assignee: The Dow Chemical Company, Midland, Mich.

[21] Appl. No.: 212,168

[22] Filed: Dec. 2, 1980

[51] Int. Cl.$^3$ ............................................... B29D 27/00
[52] U.S. Cl. ...................................... 521/143; 264/22; 264/55; 264/342 RE; 264/DIG. 18; 521/79; 521/95; 521/145; 521/149; 521/150
[58] Field of Search .............. 264/55, 54, 51, 342 RE, 264/22, DIG. 18; 521/143, 95, 145, 149, 150

[56] References Cited

U.S. PATENT DOCUMENTS

| | | | |
|---|---|---|---|
| 3,562,367 | 2/1971 | Shinohara et al. | 264/54 X |
| 3,711,584 | 1/1973 | Sagane et al. | 264/54 |
| 3,812,225 | 5/1974 | Hosoda et al. | 264/55 X |
| 3,818,086 | 6/1974 | Stastny et al. | 264/55 |
| 4,143,106 | 3/1979 | Coyne | 264/51 |
| 4,155,965 | 5/1979 | Allada | 264/54 X |
| 4,213,925 | 7/1980 | Kiyono et al. | 264/54 X |

FOREIGN PATENT DOCUMENTS 591621 1/1960 Canada .................................. 264/55

*Primary Examiner*—Philip Anderson
*Attorney, Agent, or Firm*—Jonathan W. Morse; James B. Guffey

[57] ABSTRACT

A method for foaming heat foamable thermoplastic resin preforms and the product produced thereby. Said preforms are foamed in a series of foaming stages, said series comprising at least one stress-relieving foaming stage and at least one additional foaming stage subsequent thereto and at a higher temperature. This method facilitates the production of foam sheets, slabs and planks of better quality than that provided by previously known single stage foaming methods. In an example, a crosslinked, expandable, polyethylene preform is foamed by such a method using two foaming stages.

7 Claims, No Drawings

MULTI-STAGED FOAMING OF THERMOPLASTIC RESIN

BACKGROUND OF THE INVENTION

This invention relates in one aspect to a process for foaming foamable thermoplastic resinous sheets or preforms. In a more particular aspect, it relates to a method for making thick, low density foam sheets in a submersion foaming process.

Methods to produce foam products from preformed foamable sheets of various heat plastifiable thermoplastic resins such as, for example, olefin polymer resins including polyethylene, ethylene-vinyl acetate, chlorinated polyethylene, polypropylene, polybutadiene and other crosslinkable thermoplastics are generally known in the art. In such methods, the thermoplastic resin to be employed is typically compounded with a so-called chemical or thermally decomposable blowing agent, such as azodicarbonamide, p-toluene sulfonyl semicarbazide, dinitrosopentamethylenetetraamine, etc. Upon heating, the blowing agent decomposes releasing normally gaseous decomposition products. Other additives are commonly combined with the resin and blowing agents. These include zinc stearate and zinc oxide, which help activate foaming and also calcium stearate and Paraplex G-60, which stabilize the heated resins. The resin, blowing agent and additives are then fabricated into a non-cellular sheet or preform, which can then be crosslinked by any of several known methods. Those methods include using $\beta$-radiation or $\gamma$-radiation (either of which can be used alone or in conjunction with a crosslinking promotor such as trimethylol propane triacrylate, which, if desired, can be compounded into the foamable compositions at the same time as the above-mentioned chemical blowing agent), as well as chemical crosslinking agents, such as dicumyl peroxide 2,5-dimethyl-2,5-di-(tertiary butyl peroxy) hexane or Lupersol-130. Finally, in the actual foaming step itself, the crosslinked preform is heated to a temperature above the decomposition temperature of the blowing agent, causing expansion to a foamed resin product having gas-filled predominately closed cells.

In certain of the prior art foaming methods, the preform, prior to actual foaming, is preheated to temperatures well below the decomposition temperature of the blowing agent to increase the speed of the foaming step.

It is generally known in the art that for preheating and foaming purposes the preform can be placed in or passed into and through the heating medium employed in either a continuous or a batch-wise mode, depending on the dimensions of the preform to be foamed, the dimensions of the heating medium and the equipment available. In a batch-wise foaming process, the preform is of relatively smaller dimensions and the entire preform can be completely contained in the heating medium, residing therein for the amount of time required to achieve the desired degree of foaming. The entire preform is then completely removed from the heating medium. In a continuous foaming method, the preform typically has a much greater length than its diameter, width or thickness depending on the preform shape. The residence time in said continuous method of operation depends on the combination of the linear speed of the preform through the heating medium and the length of the path taken by the preform through the heating medium. In said continuous method, preform can be supplied to the heating medium either directly after extrusion or after having been stored in a convenient manner subsequent to extrusion and, in either case, a crosslinking step can be inserted anywhere in the process prior to foaming. Combinations of continuous and batchwise modes of operation can also be employed.

Several methods of preheating and heat foaming the foamable resin preforms are known in the art and are combined or used independently in an effort to produce uniformly foamed products. These methods include using hot gases, hot liquids and/or radiant heat sources, such as infrared heaters to heat the preform.

In U.S. Pat. No. 3,711,584 to Sagane et al., there is described a process of preheating and foaming a foamable crosslinked thermoplastic resin preform strip using a combination of hot air and infrared heaters to foam said preform as it continuously falls vertically through a foaming chamber. In such process, the preform is preheated primarily to control the point at which the rapid foam expansion takes place subsequently in the foaming chamber.

In U.S. Pat. No. 3,562,367 to Shinohara et al. there is described a process of heat foaming a foamable crosslinked thermoplastic resin preform using a heated liquid bath to float and heat the preform from below while heating it from above with infrared radiation.

Among other imperfections in these methods, the heated polymer is usually in direct contact with air. This can result in oxidation and/or degradation of some polymers, unless an inert atmosphere is substituted and maintained in the foaming area. However, such addition to the process is expensive and inconvenient.

In U.S. Pat. No. 4,143,106 to Coyne and U.S. Pat. No. 4,155,965 to Allada, there are described processes to avoid the problems encountered in the above processes. The Coyne patent teaches a method for foaming a foamable thermoplastic resin preform by floating such preform upon a heated liquid bath while heating it from above by flooding the upper surface of the floating preform with a blanket of liquid at substantially the same temperature as the heated bath. The Allada patent teaches a process for heat foaming foamable preforms by completely submerging them in a heated liquid bath. In such process, the foam is kept submerged by using an endless belt moving at a speed faster than the foam transport speed to generate a dynamic fluid layer between foam and belt. This layer allows transport of the foam while it is sticky and has little tensile strength. In the Allada patent, the preforms can be preheated by a separate preheater or upon initial submersion in the liquid bath. In the Coyne patent, however, a preheating step is not used.

Even with improved processes of the Coyne and Allada patents, certain unsolved problems remain, such as, for example, the difficulty of obtaining uniform heating throughout the preform during foaming and the attendant difficulty of attaining the desired degree and uniformity of foaming in a commercially reasonable time. Moreover, such problems are particularly pronounced when attempting to produce products of low density, (e.g., less than 8 pounds per cubic foot), and of relatively thick cross-section minimum dimension (e.g., more than three-eighths inch). Foams of those sorts are especially prone towards distorting and even tearing during the foaming process.

In view of the foregoing, it is an object of this invention to provide an improved and economical method of foaming heat foamable thermoplastic resin preforms. A particular object is to provide an improvement whereby a submersion foaming process can be used to foam a thick thermoplastic resin preform and produce a thick, low density foam therefrom.

SUMMARY OF THE INVENTION

These benefits and other advantages according to the present invention are achieved in an improved method for foaming a heat foamable thermoplastic resin preform in which the improvement comprises heating and foaming the foamable preform in a series of foaming stages, said series comprising at least one stress relieving foaming stage in which the preform is partially foamed at a temperature equal to or above the decomposition temperature of the blowing agent ($T_d$) but below the temperature at which distortion and tearing occurs, and at least one additional foaming stage which is conducted subsequent to said stress-relieving foaming stage, and at a temperature higher than that of said stress-relieving foaming stage, and in which foaming is substantially completed at a foaming rate faster than the rate of foaming during said prior stress-relieving foaming stage.

The practice of the improved process of the present invention is particularly beneficial in that it permits continuous foam production at rates faster than were previously possible with conventional single stage continuous foaming processes and it produces better quality foam thereby. Moreover, such improved process is especially beneficial in that it enables the economical production of even relatively thick, low density foams, whereas that type of foam was heretofore only capable of production by rather slow and labor intensive superatmospheric batchwise techniques.

DETAILED DESCRIPTION AND EMBODIMENTS

Heat foamable thermoplastic resins, blowing agents, foam quality affecting additives, means of fabricating foamable sheets and preforms therefrom and means for crosslinking and heat foaming said sheets and preforms, which are suitable for use in conjunction with the improvement of the present invention are generally known in the art. Examples of such materials and means are disclosed in detail in U.S. Pat. No. 3,562,367 to Shinohara et al., (Toray process for floating and radiant heat foaming a foamable sheet); U.S. Pat. No. 3,711,584 to Sagane et al., (using a heated gaseous atmosphere to foam a downward falling foamable sheet); U.S. Pat. No. 4,143,106 to Coyne (flood foaming process for spraying a heated liquid medium over a floating foamable sheet) and U.S. Pat. No. 4,155,965 to Allada (using endless belts to generate dynamic layers in a heated liquid medium to allow submersion foaming); the teachings of which are all hereby incorporated by reference into the present description.

In a preferred embodiment of the present invention, the foaming step is performed via a submersion foaming technique disclosed in my copending application, Ser. No. 212,179, entitled Submersion Treatment of Foamable Thermoplastic Sheet or Preform, filed even date herewith. In accordance with such embodiment, the foamable preform is passed into a bath of a heating medium and held submerged during foaming therein. A foam restraining means holds the foaming preform submerged by a dynamic fluid layer created by the forced diffusion through a porous plate of a heat transfer fluid at substantially the same temperature as the main body of the heat transfer fluid in said bath. In this way, both surfaces of a foamable thermoplastic preform are heated and the sticky weak preform is held submerged without contacting the surface of the porous plate employed as a foam restraining means.

As noted above, the improvement of the present invention as related to the foaming of foamable resin preforms resides in the foaming of such preform in a series of heating and foaming stages. The heating mediums employed in the various foaming stages can all be of the same type or they can be of different types. Preferably, each of the chosen heating mediums are typically maintained at a higher temperature than that of the foaming stage preceding it, to foam the preform in two or more distinct and/or separate foaming stages. Preferably foaming is conducted in such a fashion that there is not a significant amount of cooling of the heated preform between the individual foaming stages.

The exact temperatures employed in the various foaming stages and the exact residence time of the preform therein are variable within certain ranges and are a major determinant of foam quality. Said temperatures and times required for foaming depend primarily upon the nature of the crosslinked thermoplastic resin employed (e.g., melting point and viscoelastic properties in heat plastified foam), the concentration and decomposition characteristics (e.g., decomposition temperature, heat of decomposition and gas yield) of the blowing agent employed, and also upon the ultimate density and thickness desired for the finished foam being produced in the foaming operation. For example, at temperatures below the so-called blowing agent decomposition temperature, the rate of decomposition, if any, of the blowing agent is relatively slow and generally results in poor quality foams having undesirably large and irregularly distributed cells. Moreover, the time required for complete decomposition of the blowing agent (and thus for complete foaming of the preform) at such relatively low temperatures is much too long for practical utilization. Further, if foaming medium temperatures are too low (or if the total residence times therein are too short) a portion of the blowing agent can remain undecomposed and result in a discolored foam product. Accordingly, the minimum temperature employed in each of the foaming stages is typically at least that which produces fairly rapid decomposition of the blowing agent employed and which thus results in a rather rapid expansion of the thermoplastic preform containing such blowing agent. The minimum temperature at which such rapid decomposition occurs for a given blowing agent is generally referred to in the art (and is referred to herein) as the decomposition temperature of such blowing agent.

Another point to be recognized and considered in the practice of the present invention is the fact that as the preform is heated, its edges and corners, since they are heated from two and three sides, respectively, tend to heat up (and thus expand) faster than the flat outer surfaces and the interior areas. The result of this is non-uniform expansion, which can cause severe stress in the heat softened thermoplastic material between the external areas expanding rapidly due to the two- and three-dimensional heating and the internal areas and flat external surfaces that are expanding more slowly.

Due to these stresses created during heating and expansion, the expanding foam can become distorted and can even tear. In addition to amplifying the magnitude of the aforementioned non-uniform expansion stresses, a higher heating medium temperature also reduces the strength of the thermoplastic resin. If the heating medium temperature is too hot, the thermoplastic, having reduced ability to resist these stresses, can tear much more easily than in a heating medium that is not as hot wherein the thermoplastic is, therefore, relatively stronger. Accordingly, the maximum temperature employed in the various foaming stages in the practice of the present invention is controlled or selected so as to be below that which results in significant deformation or tearing of the final foamed product.

Within the foregoing general constraints then, the heating medium temperature employed in the aforementioned stress-relieving foaming stage ($T_1$) is selected so as to be sufficiently high that foaming is initiated and maintained at a rate such that the foam product has fine, uniform cells but the temperature is not so high as to cause permanent distortion or tearing in the final foam product. In short, such stress-relieving foaming stage temperature, while being high enough to cause a significant rate and degree of foaming, on the other hand must not be so high that the softened thermoplastic resin itself is unable to withstand the stresses occurring during the initial expansion stages.

Generally, the most desirable or optimum stress-relieving stage foaming temperature is found by a trial and error process. Individual samples of the particular foamable preform are separately foamed, each foamed at a higher temperature, starting at the blowing agent decomposition temperature ($T_d$) and ending at the temperature which produces distorted and/or torn foam in a single stage process. Such latter temperature being hereinafter referred to as the critical temperature ($T_c$). Typically, the preferred stress-relieving stage foaming temperature is several degrees below $T_c$ and generally falls within a range of from about $T_d + 1/10 (T_c - T_d)$ to about $T_d + 4/5 (T_c - T_d)$, so as to minimize the risk of distorting and tearing the foam while keeping the foaming process economically efficient.

Subsequent to the stress-relieving foaming stage, the preform is heated in one or more additional foaming stages at a higher temperature which accelerates final foaming. Surprisingly, the partially expanded foam, having already withstood the first stage non-uniform expansion stresses, and being at least partially relieved of such stresses then withstands heating to the somewhat higher subsequent foaming stage temperatures without suffering permanent distortion or tearing, even though the polymer is further weakened by those higher temperatures.

The temperature of the second foaming stage (and, preferably, of any subsequent foaming stages, if more than two stages are desired) is/are progressively higher than that of the preceding stage or stages. These subsequent stage temperatures can be, and for economic reasons preferably are, higher than the value of $T_c$ as described above. Naturally, however, the maximum temperature constraint for these subsequent stages typically remains that temperature above which significant permanent distortion and/or tearing is obtained in the final product. It should, however, be noted that distortion and tearing problems in the second and later stages can oftentimes be corrected by further lowering the first or other preceding stage temperatures. In addition, subsequent stage temperatures can sometimes be further adjusted and fine-tuned (and overall foaming times reduced) by experimenting with shorter times and higher temperatures and/or by introducing additional foaming stages.

The residence times employed for each of the various foaming stages may be chosen so as to achieve maximum efficiency in the overall foaming process. However, it should be noted that if the first foaming stage residence time ($t_1$) is too short, the initial expansion stresses may not be sufficiently relieved and higher temperatures can then cause distortion and tearing in the later foaming stages. On the other hand, if $t_1$ is too long, the process looses its efficiency advantages. In view of these factors, it is, in the case of a two-stage foaming process, generally preferable that $t_1$ be from about two-thirds to about nine-tenths of the total residence time of the overall foaming process, with the remaining residence time occurring in the second and final foaming stage. When more than two stages are used, the residence time in a given subsequent stage is typically but not necessarily progressively shorter than that in the stage preceding it.

The following specific examples illustrate the invention but are not to be taken as limiting its scope. Parts and percentages are by weight unless otherwise indicated or required by context.

EXAMPLE 1

Low Density Polyethylene Foam

A foamable sheet is prepared comprising 100 parts low density polyethylene, (density of 0.916 grams per cubic centimeter, melt index of 5.5), and 14 parts azodicarbonamide blowing agent, containing 3.125% zinc stearate. These components are melt-blended on a set of compounding rolls at 125°-130° C. for about 8 minutes, then compression molded in a positive pressure mold (6"×6") at 120°-125° C. for 5 minutes at approximately 500 psi. After cooling to room temperature, the sheet is removed from the mold and crosslinked with 3.5 Mrads of high voltage electron beam radiation one half of the radiation being from each side of the sheet. The resultant preformed foamable sheet is 0.393 inch thick, and is cut into individual samples 1 inch square which are then heat foamed by immersion in molten Hitec ® salt at the desired uniform temperature. The sample is kept immersed against the boyancy of expanding foam with the aid of a rigid flat support above the sheet. Improved heat transfer from the liquid to the sheet is facilitated by maintaining liquid circulation relative to the sheet and/or giving the sheet a gentle up and down motion within the molten salt bath. In the cases where only a single stage is used, the sample is heated in the molten salt until foaming is completed. When multiple stages are used, the sample is heated in the initial molten salt baths for a predetermined length of time. In the final foaming stage, the partially foamed sample is heated until foaming is completed, the sample being fully expanded and white. The foam is then cooled, washed in water to remove adhering salt and dried. The resulting foamed samples have a thickness of about 1 inch and a density of about 2 pounds per cubic foot. Following are the results of such a procedure, illustrating the improvements achievable through multi-stage foaming.

TABLE I

LDPE Foaming

| Sample | Foaming Temperature (°C.) First Stage | Foaming Temperature (°C.) Single or Second Stage | Foaming Time (Seconds) First Stage | Foaming Time (Seconds) Second Stage | Single or Total | Foam Quality |
|---|---|---|---|---|---|---|
| *Control |  | 210 |  |  | 410 | Torn and distorted |
| Sample 1 | 185 | 220 | 360 | 115 | 475 | Good, white and undistorted |
| Sample 2 | 205 | 230 | 330 | 60 | 390 | Good |

*Not an example of the claimed invention.

EXAMPLE 2

Ethylene-Vinyl Acetate Copolymer Foam

A foamable sheet is prepared comprising 100 parts ethylene-vinyl acetate (EVA) copolymer and 14.28 parts azodicarbonamide blowing agent; the blowing agent containing 2% ZnO activator to increase the foaming rate. The EVA has a melt index of 6, density of 0.955 grams per cubic centimeter and a vinyl acetate content of 28%. These components are melt-blended on a set of compounding rolls at 125°–130° C. for five minutes at approximately 500 psi. In molding EVA it is important to leave no residual stresses frozen in the sheet because they can cause blisters inside thick sheets. These potential residual stresses are prevented by leaving the sample in the mold at the high temperature for a sufficiently long time to allow easy flow, and after molding to cool the sample quite slowly. After cooling slowly to room temperature, the sample is removed from the mold and crosslinked with a total of 3.215 Mrads of high voltage electron beam radiation, one half being from each side of the sheet. The resultant foamable sheet or preform is 0.38 inch thick and is cut into individual samples 1 inch square. These samples are submersion foamed in the same manner as the samples in Example 1 and the resulting expanded samples have a thickness of approximately 1 inch and a density of approximately 2 pounds per cubic foot. Following is a table summarizing the results of this procedure.

TABLE II

EVA Foaming

| Sample | Foaming Temperature (°C.) First Stage | Foaming Temperature (°C.) Single or Second Stage | Foaming Time (Seconds) First Stage | Foaming Time (Seconds) Second Stage | Single or Total | Foam Quality |
|---|---|---|---|---|---|---|
| *Control |  | 200 |  |  | 300 | Yellow, curled, blistered |
| Sample 1 | 180 | 220 | 360 | 30 | 390 | Good, light cream colored, no blisters |
| Sample 2 | 180 | 225 | 360 | 30 | 390 | Good |

*Not an example of the claimed invention.

EXAMPLE 3

Chlorinated Polyethylene Foams

Foamable sheets are prepared comprising 100 parts chlorinated polyethylene (CPE) and differing amounts of azodicarbonamide blowing agent. The CPE is of low (less than 2%) crystallinity, contains 36% $Cl_2$ and has a melt index of 6. Also added are 3 parts Paraplex G-60 and 2 parts calcium stearate to stabilize the polymer at the foaming temperatures. Using these components, a sheet is prepared in the same manner as the sheet in Example 1 except that 6 Mrads of radiation are used to crosslink the polymer. The resultant foamable sheet or preform, varying in thickness depending on the blowing agent content, is cut into individual samples 1.75 inches square. The individual samples are submersion foamed in the same manner as the samples in Example 1. These samples, when foamed, produce an expanded foam with a thickness of approximately 1 inch and the density, as indicated in the following Table, varies depending on the blowing agent content. The following table compares the results of single and multiple stage foaming for the different density foams.

TABLE III

CPE Foaming

| Sample | Blowing Agent Concentration (parts per hundred parts of resin) | Preform Thickness (inches) | Foaming Temperatures (°C.) First Stage | Foaming Temperatures (°C.) Single or Second Stage | Foaming Time (Seconds) First Stage | Foaming Time (Seconds) Second Stage | Single Stage or Total Time | Foam Quality | Foam Density (lb/ft²) |
|---|---|---|---|---|---|---|---|---|---|
| *Control 1 | 5.3 | 0.345 |  | 220 |  |  | 390 | Distorted | more than 5.8 |
| Sample 1 | 5.3 | 0.345 | 210 | 220 | 300 | 150 | 450 | Good, white | 5.8 |
| *Control 2 | 8 | 0.347 |  | 210 |  |  | 480 | Slight tear | more than 3.8 |
| Sample 2 | 8 | 0.347 | 210 | 225 | 450 | 25 | 475 | Good | 3.8 |
| *Control 3 | 10 | 0.328 |  | 205 |  |  | 450 | Slightly distorted | more than 2.9 |
| Sample 3 | 10 | 0.328 | 205 | 215 | 420 | 25 | 445 | Good | 2.9 |

*Not an example of the claimed invention.

It should be noted that, for chlorinated polyethylene foam of the above-exemplified densities and thickness, the critical temperature is approximately 210° C. The main benefit shown in the above table is that the multiple stage foaming achieves lower density foam through more complete decomposition of the blowing agent in slightly less time.

EXAMPLE 4

High Density Polyethylene Foam

A foamable sheet is prepared comprising 100 parts high density polyethylene, (density of 0.964 grams per cubic centimeter, of melt index 5), and 5.3 parts azodicarbonamide blowing agent containing 3.125% zinc stearate activator. With these components, a foamable sheet is prepared in the same manner as the sheet in Example 1 is prepared, except that the radiation dose used to crosslink the sheet is increased to 6 Mrads. The resultant foamable sheet is 0.5 inches thick and is cut into individual samples 1.75 inches square. These samples, after submersion foaming in the same manner as the samples in Example 1, produce an expanded foam with a thickness of approximately 1 inch. The densities of the resulting foams are in the range of 6 to 8 pounds per cubic foot. It should be noted that the critical temperature for these high density polyethylene samples is approximately 220° C. The following Table summarizes and compares the results obtained by single and multiple-stage foaming.

TABLE IV

| | HDPE Foaming | | | | | |
|---|---|---|---|---|---|---|
| | Foaming Temperature (°C.) | | Foaming Time (Seconds) | | | |
| Sample | Single or First Stage | Second Stage | First Stage | Second Stage | Single or Total | Foam Quality |
| *Control | 220 | | | | 600 | White and torn |
| Sample 1 | 220 | 240 | 240 | 300 | 540 | Good, white and untorn |

*Not an example of the claimed invention.

What is claimed is:

1. In a method of preparing a thermoplastic foam article wherein a heat foamable thermoplastic preform is heated to a temperature at or above the decomposition temperature of a blowing agent compounded in the preform and foamed, the improvement wherein the foamable preform is heated and foamed in a series of foaming stages, said series comprising at least one stress-relieving foaming stage in which the preform is partially foamed at a temperature equal to or above the decomposition temperature of the blowing agent ($T_d$) but below the temperature at which distortion and tearing occurs, and at least one additional foaming stage which is conducted subsequent to said stress-relieving foaming stage and at a temperature higher than that of said stress-relieving foaming stage, and in which foaming is substantially completed at a foaming rate faster than the rate of foaming during said prior stress-relieving foaming stage.

2. The method of claim 1 wherein the thermoplastic foam article prepared is a sheet, slab or plank, the thickness of which is greater than three eighths (⅜") inch.

3. The method of claim 1 wherein the foamable thermoplastic preform is heated by submersion in a body of heated liquid.

4. The method of claim 3, wherein the submersion foaming is done in a continuous mode.

5. The method of claim 1, wherein the length of time for which the preform is heated in the first foaming stage is from about two-thirds to about nine-tenths of the total time of the overall foaming process.

6. The method of claim 1, wherein the temperature at which the preform is heated in the first foaming stage falls within a range of about $T_d + 1/10\ (T_c - T_d)$ to about $T_d + 4/5\ (T_c - T_d)$, wherein $T_d$ is the blowing agent decomposition temperature and $T_c$ is the critical temperature of the preform.

7. A thermoplastic foam article prepared by the foaming method of claim 1.

* * * * *